United States Patent [19]
Maiocco et al.

[11] Patent Number: 5,148,372
[45] Date of Patent: Sep. 15, 1992

[54] INTERACTIVE GRAPHIC SYSTEM FOR THE MATHEMATICAL REPRESENTATION OF PHYSICAL MODELS

[75] Inventors: Roberto Maiocco; Luciano Basadonna; Renato De Alessi, all of Turin, Italy

[73] Assignee: D.E.A. Digital Electronic Automation S.p.A., Turin, Italy

[21] Appl. No.: 254,351

[22] Filed: Oct. 6, 1988

Related U.S. Application Data

[63] Continuation of Ser. No. 249,803, Sep. 27, 1988, Pat. No. 4,979,224.

[30] Foreign Application Priority Data

Oct. 6, 1987 [IT] Italy ............................... 67848 A/87

[51] Int. Cl.$^5$ ............................................. G06F 15/46
[52] U.S. Cl. .......................... 364/474.24; 364/474.37; 364/551.02
[58] Field of Search ....................... 364/474.24, 474.03, 364/474.05, 474.37, 474.21, 551.01, 551.02, 560, 468, 513; 901/44, 46; 33/503, 504; 382/1, 8, 22

[56] References Cited

U.S. PATENT DOCUMENTS

| | | | |
|---|---|---|---|
| 4,653,011 | 3/1987 | Iwano | 901/44 X |
| 4,724,525 | 2/1988 | Purcell et al. | 364/474.37 X |
| 4,789,931 | 12/1988 | Kurgano et al. | 364/474.21 X |
| 4,807,152 | 2/1989 | Lane et al. | 364/474.37 X |
| 4,811,253 | 3/1989 | Johns | 364/474.37 |

*Primary Examiner*—Joseph Ruggiero
*Attorney, Agent, or Firm*—Gifford, Groh, Sprinkle, Patmore and Anderson

[57] ABSTRACT

An interactive graphics system for the mathematical representation of physical models, comprising at least one measuring machine bidirectionally connected to a central unit to which are connected a video screen and a keyboard and including processor means adapted to receive from the measuring machine information on at least initial identification points of the model, to control the automatic detection of information on additional points of the model by means of the same measuring machine, and to process this point information to produce the mathematical representation of the model.

8 Claims, 8 Drawing Sheets

INTERACTIVE GRAPHIC SYSTEM FOR THE MATHEMATICAL REPRESENTATION OF PHYSICAL MODELS

This application is a continuation application of U.S. patent application Ser. No. 07/249,803, filed Sep. 27, 1988 now U.S. Pat. No. 4,979,224, entitled AN INTERACTIVE GRAPHIC SYSTEM FOR THE MATHEMATICAL REPRESENTATION OF PHYSICAL MODELS.

BACKGROUND OF THE INVENTION

The present invention relates to an interactive graphic system for the mathematical representation of physical models by digitation of surfaces and computer aided design (CAD) of the parts outside the figure or not available on the model.

As is known, particularly in the fashion, model making and mold-making sectors, there is the problem of obtaining a program for controlling a machine tool, for example for working a molded item with numerically controlled grinders, directly from a model of the workpiece to be produced. If the model is constituted by a physical reproduction of the workpiece the program must be generated by digitation of the model itself; in this case the fundamental requirement is to obtain a rapid and reliable digitation. A typical processing requirement of the program is that of obtaining the two halves (die and matrix) of the mold directly from a single digitation of the model.

The available known techniques for use are the copy grinding method, the detection and recording method, and the digitation with measuring machine method; all these methods, however, have disadvantages, which limit the advantages of use, in fact:

the copy grinding method, while having the advantage of not requiring any dedicated digitising apparatus in that the scanning feeler directly controls the grinder, has the disadvantage of producing only a single shape for each scan of the model, of having a grinding speed limited by the lower scanning speed imposed by the feeler, of having a reduction in the scanning precision caused by the vibrations induced by working, and of not being able to compensate the form and errors of the feeler because the working is in line with the detection phase; finally it is necessary to change the tool tip and repeat the model scanning process at each working stage;

the detection and recording method also utilizes a copying grinder as the basic machine, but the process is divided into two parts: digitation and working; a control unit in fact controls the first part of the process, namely digitation of the model utilizing the grinder and its feeler at a speed allowed by the feeler itself, and the result is recorded on a disc; subsequently the same unit controls the machine in the grinding phase at the maximum speed allowed by the machine tool using the previously recorded data; in this case the scanning phase represents about 20-30% of the overall process time and the detection of the model must be repeated in the various working phases (roughing out, semi-finishing and finishing); the use of the grinder for scanning the model, taking it away from working, is however inefficient and uneconomic;

the digitation with measuring machine method utilises a dedicated machine for generating a the model and generates a program for controlling several grinders, the scan data is processed by a processor which optimizes the cutting paths and derives programs for roughing out, semi-finishing and finishing from the same set of scan data, and the same measuring machine can be utilized for dimensionally controlling the working results; this method obtains the maximum use of the machine tool which can work full time and at maximum efficiency: the main limitations consist in; the low digitation speed due to the necessity of detecting all the points required for the precise control of the grinder in the finishing phase, and by the necessity of rotating the feeler; the cost of the system due to the dimensions of the machine and the configuration of the feelers; the low precision due to the impossibility of compensating for the spacial dimensions of the feeler; and the relative incompleteness of the process, which permits only the data derived from the physical model to be processed (this limitation is however shared with the other methods described above).

Moreover there is a further limitation with these three methods due to the fact that they can only generate programs for the grinder on three axes, and not on five axes which, on the other hand, would allow a faster operating speed and a better finish.

SUMMARY OF THE INVENTION

The object of the present invention is therefore that of overcoming the above described disadvantages of the known methods, which principally appear as limitations of use due to the slowness of the digitation process, to the insufficient processing capacity of the data detected, and the impossibility of interacting on-line with computer aided design and manufacturing systems (CAD/CAM) for the definition of the parts of the form not present in the physical model.

The said object is achieved by the present invention in that it relates to an interactive system for the mathematical representation of physical models, characterised by the fact that it comprises at least one measuring robot or machine and processing means adapted to receive information on at least initial identification points of the model, to provide automatic signals for the detection of information on additional points on the model by the measuring robot or machine, and to process the said point information to provide the said mathematical representation of the said model.

BRIEF DESCRIPTION OF THE DRAWINGS

For a better understanding of the present invention a preferred embodiment is hereinafter described purely by way of non-limitative example and with reference to the attached drawings, in which.

DETAILED DESCRIPTION OF THE INVENTION

Figure 1:
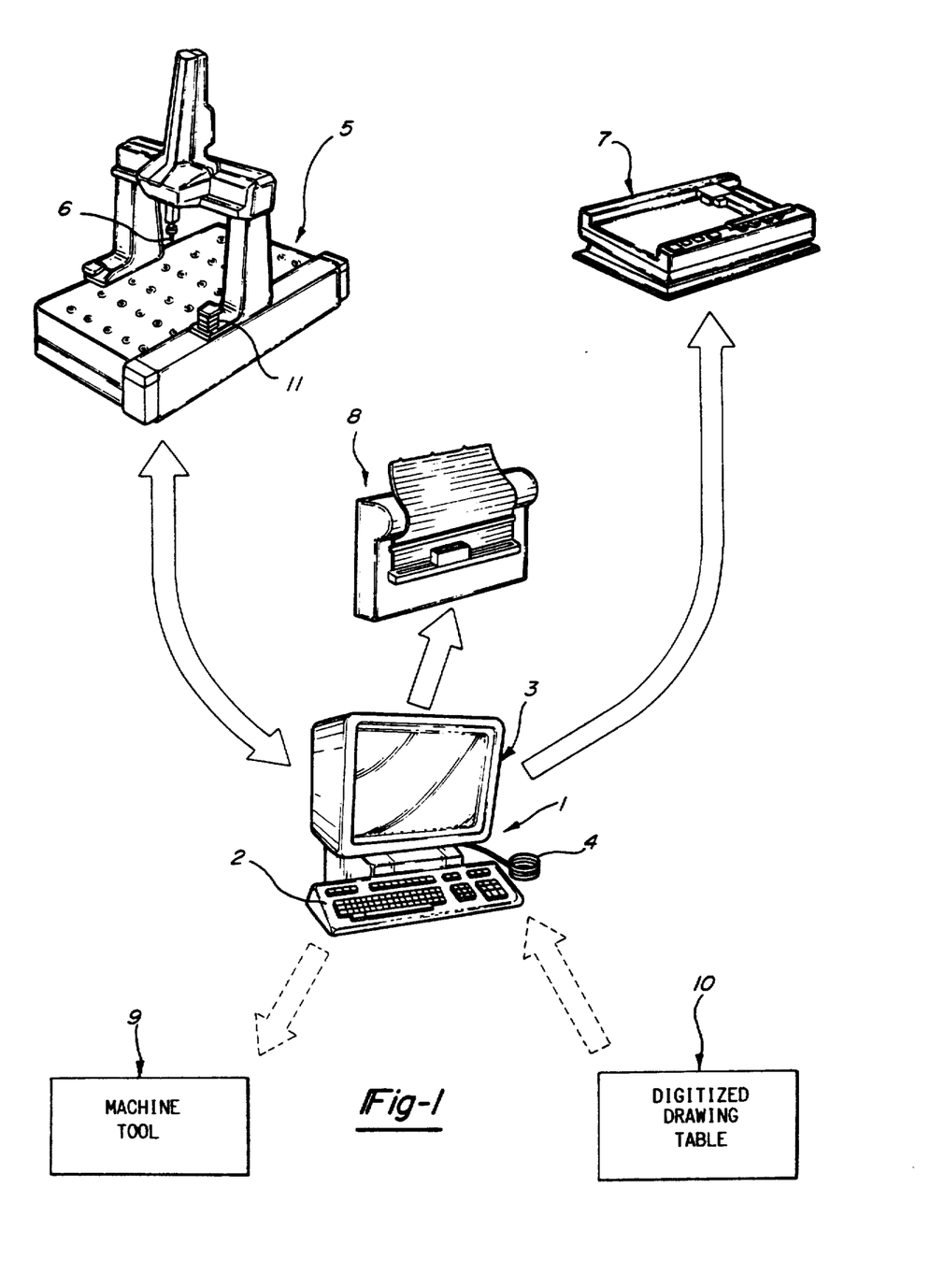
FIG. 1 is a schematic illustration of the component elements of the system of the present invention.

With reference to FIG. 1, the reference numeral 1 indicates a central unit comprising processor means and conventional means for communication with an operator such as a keyboard 2, a video screen 3 and an element 4 (mouse) for the selection of points or lines or surfaces on the screen 3. This unit 1 can comprise a conventional basic graphic work station constituted by a 32 bit computerized system on which an optical computer aided design and manufacturing system (CAD/-CAM) for example a Selenia-Autotrol (S 7000) can be installed, which offers the availability of fully developed mathematical design and three dimensional modeling functions.

The unit 1 is bidirectionally connected to an automatic three dimensional digitizer 5 constituted by a measuring machine of known type provided with a movable measuring head with carriages driven on three orthogonal cartesian axes carrying a measurement feeler 6 of the point-by-point type, and with a sensor 11 for sensitive manual control of the movements of the measuring head and for manual detection of the points on a workpiece; the unit 1 is further unidirectionally connected to a plotter 7 and a printer 8. The unit 1 can then be connected unidirectionally to a machine tool 9, for example a numerically controlled grinder, and can receive data unidirectionally from a digitized drawings table 10.

Figure 2:
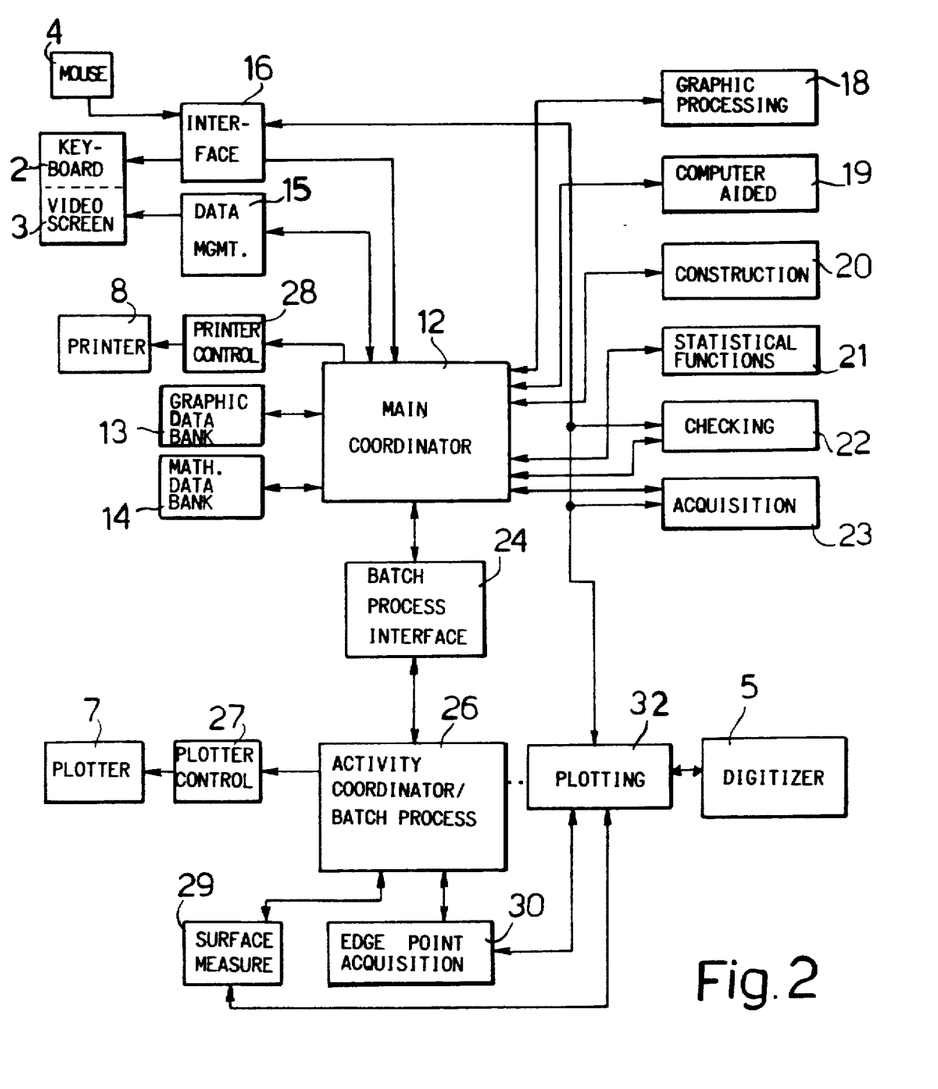
FIG. 2 is a block schematic diagram of the main processing unit of the system of FIG. 1.

With reference to FIG. 2, the reference numeral 12 indicates a main coordinator block for coordinating the activity of the central unit 1, to which it is connected:

bidirectionally with graphic and mathematical data banks 13 and 14 respectively;

bidirectionally with a block 15 for management of the data on the video screen 3;

unidirectionally with a printer control block 28 for controlling the printer 8;

unidirectionally with an interface block 16 for interfacing with the terminals which communicate between an operator and the system, which in the specific case comprise the keyboard 2 and the mouse 4;

bidirectionally with:

a graphic processing block 18 relating to the conventional functions of a graphic processor, such as for example enlargement (zoom), displacement of view, etc, a computer aided design block 19 relating to conventional functions of computer aided design (CAD), comprising for example functions for forming generalized connections (smoothing) between contiguous zones (patches) by forcing either the continuity of the tangents or the continuity of the curvature at the boundary, functions for producing connecting surfaces (blending) between adjacent but non-contiguous patches, in such a way as to fill the areas left empty by the reconstruction process, maintaining the characteristics of uniformity of the surfaces, functions for generating connecting curves (filleting) between patches which are close but not adjacent, for which a connection of this kind has to be drawn, a construction block 20 relating to dedicated construction functions such as, for example, interactive optimization of (Bezier) poles of the model (for example by means of the possible displacement of poles, or by modificating the order of the surface which varies the number of poles without changing the surface, or by the alignment of a certain number of poles), the construction of islands of exclusion and boundaries of the model, the construction of an extended surface over the boundary curves, a checking block 21 relating to statistical functions descriptive of the dispersion of the measurements, a block 22 relating to functions for checking the surfaces described by the mathematical model, such checking functions being:
a) of point type
b) of the type checking over several points
c) according to a measurement scheme
d) by checking of points and their associated normals;
in the first case a check point is defined on the surface, for example on the video screen 3 by crossing isoparametric curves, or on the keyboard 2 by the coordinates, or by the coordinates of an approximate point on the surface, from which the unit 1 calculates the coordinates of the closest point on the surface; in the second case an isoparametric curve is chosen, for example on the video screen 3, or with the indication of directions, or with the indication of the value of the topological coordinates; in the third case points on the surface are chosen according to a scheme, for example along a diagonal and at constant pitch; in the fourth case there is created an archive of theoretical points and direction cosines of the points themselves;

a acquisition block 23 relating to the acquisition of principal points on the edge curves, which memorises the detection (effected for example with the measurement machine 5) of these principal points and, with path approximation, provides an indication of a first approximation of the identifying data of this edge curve or boundary;

and bidirectionally with a block 24 interfacing with the batch processes, which is connected bidirectionally to another main block 26 which is a system activity coordinator and batch process distributor.

This block 26 is connected:

unidirectionally to a plotter control block 27 for control of the drawing element 7 (plotter);

bidirectionally with surface measurement block 29 and edge point acquisition block 30 respectively for the automatic measurement of the real surface and creation of the mathematical model, and for the automatic acquisition of the edge points and construction of the boundary curves (operation of these blocks will be described in more detail hereinafter); these two blocks 29 and 30 are in turn bidirectionally connected to a block 32 which constitutes a piloting block for control of and communication with the digitizer 5, to which this block 32 is bidirectionally connected.

The block 32 further performs the same activity coordination function as the block 26, and is bidirectionally connected to the block 16 for communication with the operator and with the blocks 22 and 23.

The automatic mathematical reconstruction of the surface of a physical model by means of the system of the present invention, which utilizes a computer aided graphic design module (CAD) which automatically interacts with the measurement machine, takes place with the following steps which will be described with reference to the flow chart of FIG. 3, and also with reference to Figures from 4 to 11.

Initially the operator performs a division of the surface of the physical model into zones (patches) and indicates their limits on the surface itself.

Subsequently, as is indicated by the manual control block 60 of FIG. 3, the operator controls, for example manually by means of the sensor 11 of the digitizer 5, acquisition of the coordinates of guide points of the edge curves of the patches, as is visible in FIG. 4, in which these guide points are represented with small squares and indicated with the numerals 40, and in which the patches are indicated with the numerals 41 and 42; with reference to FIG. 2, the acquisition of the coordinates of these guide points 40 with the digitizer 5 through the block 32 is controlled and memorised with the block 23.

Figure 3:
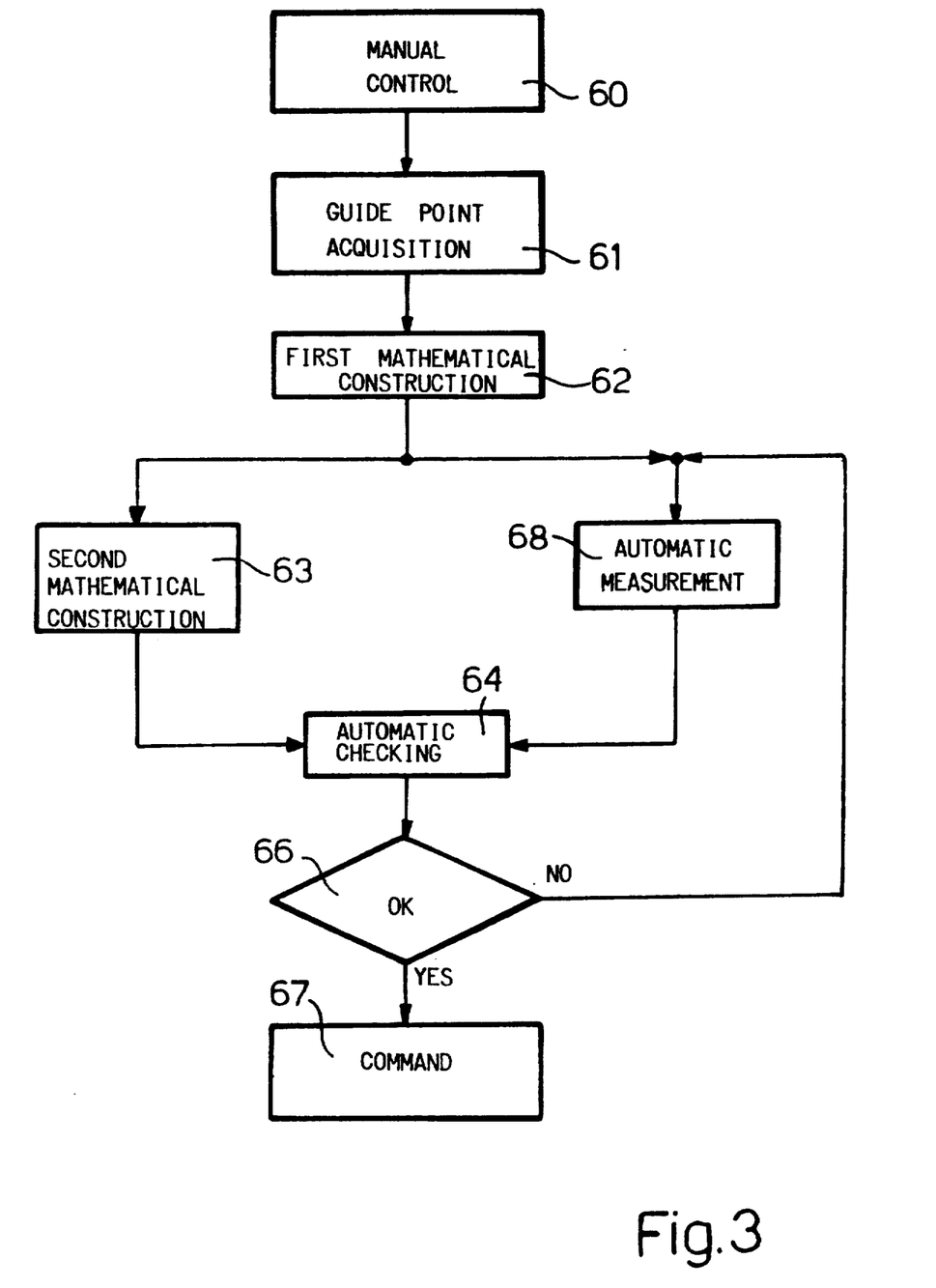
FIG. 3 is a block diagram illustrating the operation of the system of the present invention.
Figure 4:
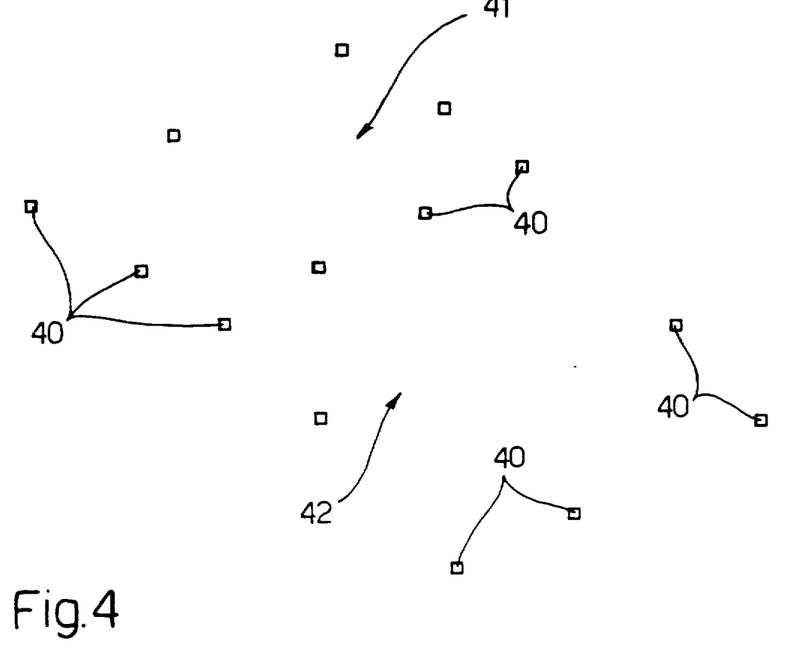
FIGS. 4 to 11 are exemplary illustrations of the digitation of surfaces using the system of the present invention.
Figure 5:
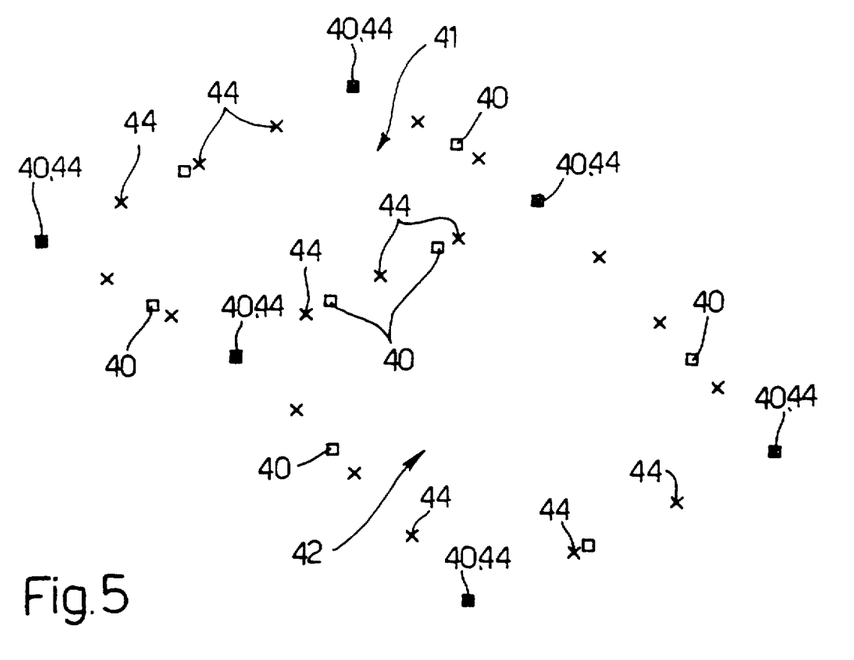

With reference to FIG. 3, when the block 60 has detected (for example by means of a signal provided by the operator) the completion of the acquisition of the coordinates of these guide points 40, automatic acquisition with the digitizer 5 of the points on the physical model which define, with the necessary precision, the boundary curve for each side of the outline of the patch is controlled by the subsequent guide point acquisition block 61; whilst the construction of these boundary curves between the guide points 40 is selected by the operator by positioning of the mouse 4 which displays the selection on the screen 3, the number of automatic detection points is defined by the operator as a function of the required precision, and their position is consequently determined automatically by the system. With reference to FIG. 5, these points automatically detected by the digitizer 5 along the boundary curves on the physical model are represented by a cross indicated as detection points 44; with reference to FIG. 2, the block 30 controls this automatic acquisition of the coordinates of the points 44 via the block 32 and with the coordination of the block 26, and via the block 15 the block 12 controls the graphic representation, on the screen 3 of the unit 1, of the points 44 detected by the feeler 6 and indicated with the crosses in FIG. 5.

Figure 6:
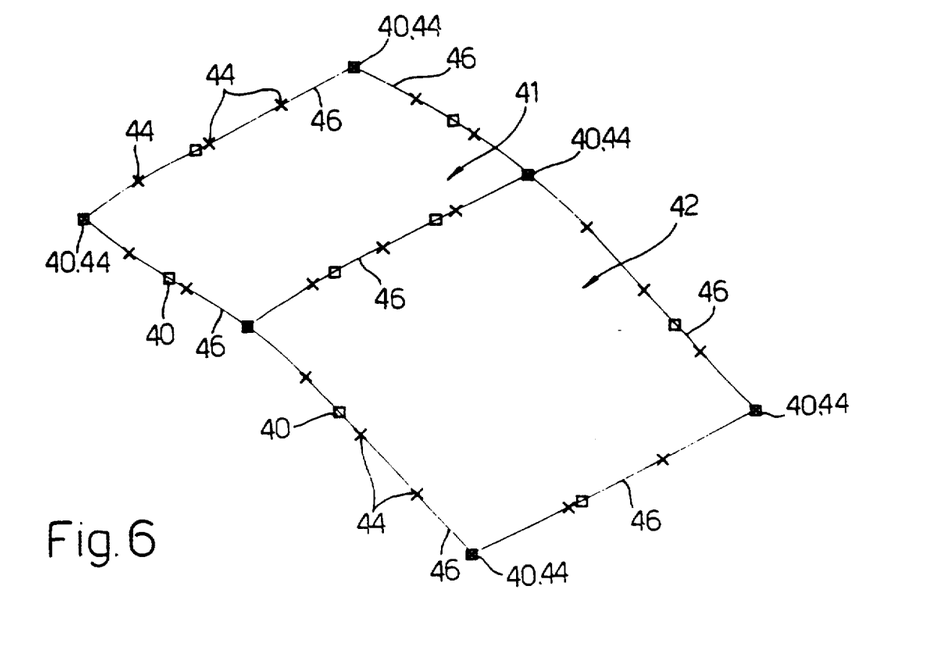

In a second phase the block 61 (FIG. 3) also controls the automatic construction of the boundary curves of the patches by means of a technique known for the construction of Bezier curves (up to the 21st order) which approximate the boundaries of the patch; these Bezier curves are calculated in such a way as to minimize the separation at the points 44 detected on the physical model by means of the measurement machine 5; because these curves adapt themselves to these points by creating soft profiles which minimise the separation, they require a smaller number of points and represent a more rapid and more flexible technique than that which utilizes the simple interpolation of curves to join the digitized points together. With reference to FIG. 6, these boundary curves of the patches 41 and 42 are indicated with the numeral 46 and are calculated between the guide points 44, and they are represented by the block 15 (FIG. 2) on the video screen 3; the construction of the said boundary curves 46 is commanded and controlled by the said Bezier mathematics block 30.

Figure 7:
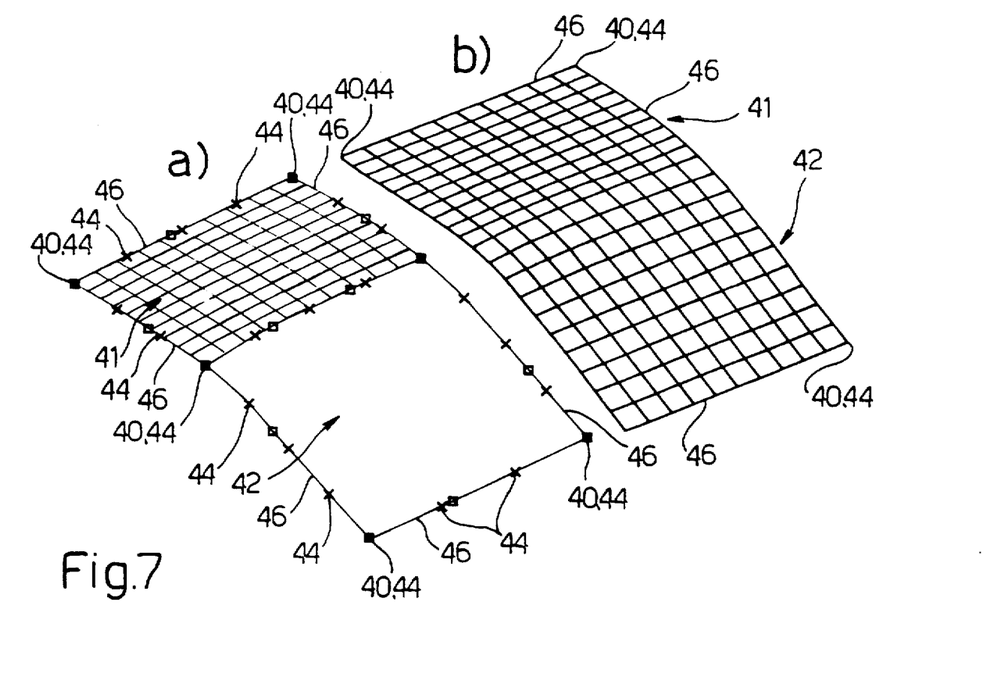

With reference to FIG. 3, after the block 61 there then follows a mathematical construction block 62 which commands the automatic mathematical construction of the first approximation extended surface which overlies the patch boundary curves, which have previously been calculated by the block 61; in FIG. 7a is illustrated the graphic representation of this construction for the single patch 41, whilst in FIG. 7b is illustrated the complete graphic representation for the two patches 41 and 42, which on the video screen 3, by means of the block 15 (FIG. 2) is defined by a plurality of curves within the patch and parallel to the boundary curve 46, and mathematically it is calculated by the block 20.

Since the points 44 detected by the feeler 6 of the measurement machine 4 are utilized to construct the boundary curves 46 of the patches they do not lie on the surface of the physical model but correspond to the position of the centre of the feeler tip (usually a sphere), the mathematically constructed surface is in reality spaced from the real surface of the model. The unit 1 of the present invention automatically reconstructs the real surface of the model by applying the dimensions of the feeler in a precise three dimensional compensation procedure, this can be achieved from the point of view that the unit 1 itself knows the local normal vectors of all points on the generated Bezier surface, and can therefore calculate the compensation of the feeler dimensions in these directions. This method of compensation on the detected surface is advantageous over the conventional technique of applying compensation for the dimensions of the feeler directly to the points detected by the measurement machine in the scanning plane.

Figure 8:
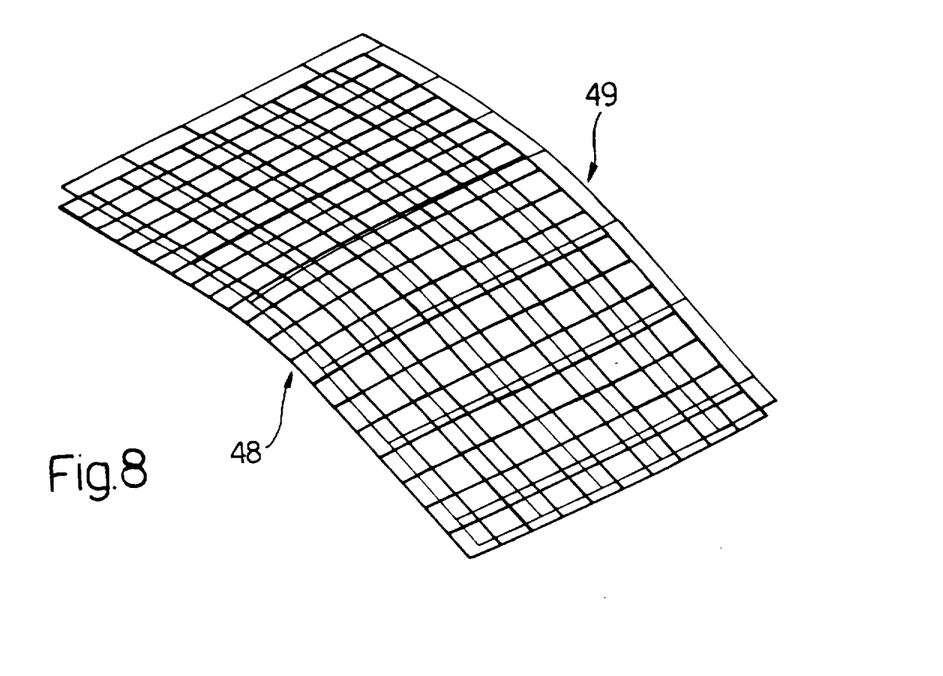
Figure 9:
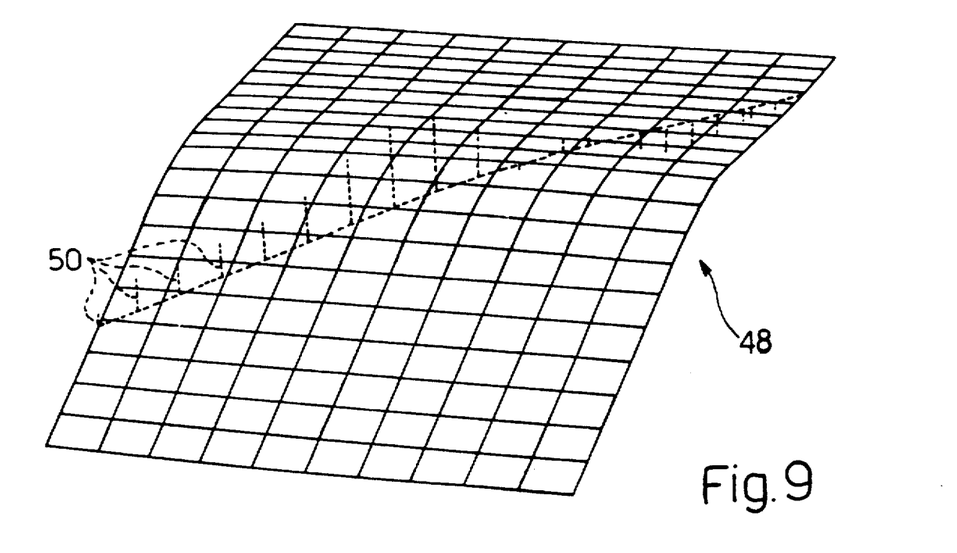

With reference to FIG. 3, from the block 62 the operator can decide whether to command this mathematically calculated surface compensation phase directly or else whether to command the automatic acquisition by the digitizer 5 of internal points within the patch: this choice is generally made on the basis of the irregularity which the model has within the patches 41-42, constituted in practice by accentuated variations of curvature of the surface. If these irregularities are minimal, and supposing that the first procedure is chosen, the second mathematical construction block 62 is followed by a block 63 which commands the mathematical construction of the compensated surface from the dimensional error of the feeler 6, and this compensated surface, together with the extended surface constructed by the block 62 is displayed on the screen 3 by the block 15 (FIG. 2), as is seen in FIG. 8 in which these two surfaces are respectively indicated as first surface 48 and compensated surface 49.

The block 63 (FIG. 3) is then followed by block 64 which commands the automatic checking by the digitizer 5 of the separation between the real surface of the model and that constructed mathematically and compensated, by measuring some significant points defined by the unit 1 or the operator, and presenting the separation in numerical and three dimensional graphic form. This automatic checking is controlled by the block 22 (FIG. 2), with the coordinates determined by the block 12 and via the block 32 for communication with the measuring machine 5, whilst the statistical processing of the measurement results, with the information on the maximum and minimum detected separations and the points to which these separations refer, of the mean value of the separations and the mean square deviation of the separations is effected by the block 21. The graphic presentation on the video screen 3 of the results of the check is controlled by the block 15 and is illustrated indicatively in FIG. 9, in which over the compensated surface 49 there are indicated the separations of the model from the real surface, representing them as vectors 50 having origins on the surface 49 and terminating in the points detected on the physical model, amplified by a scale factor selectable by the operator.

Figure 10:
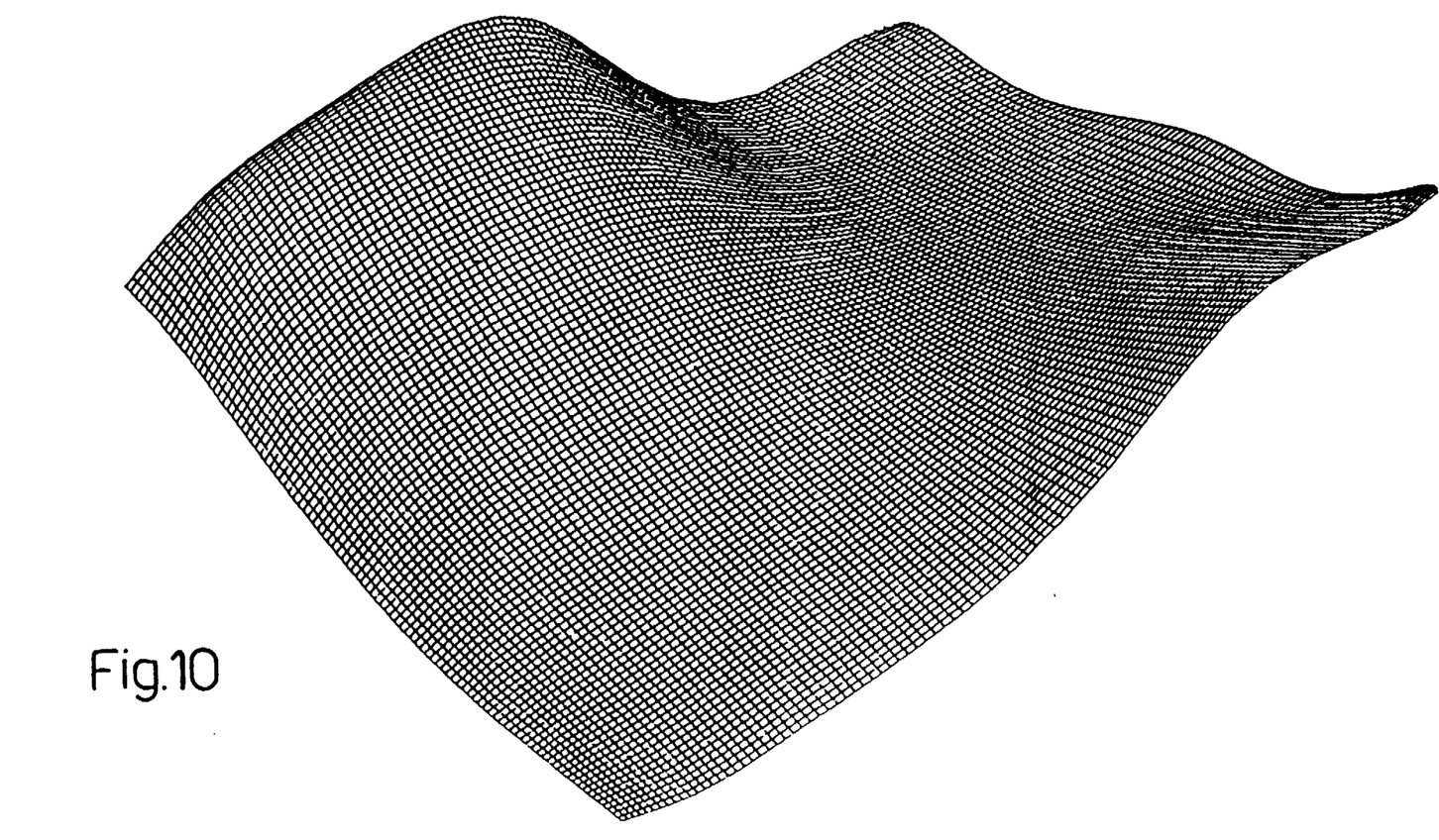

From the block 64 (FIG. 3) the process proceeds to an evaluation block 66 which evaluates if the separations between the real surface of the model and that constructed mathematically and detected by the block 64 are contained within predetermined limits, which can be established by the unit 1 or defined and checked by the operator; in the positive case, that is if the mathematical construction of the model is sufficiently precise, the process continues to a command block 67 which commands the final mathematical model to be obtained, and the representation of which as it appears on the video screen 3 is illustrated in FIG. 10; in fact the coordinator block 12 (FIG. 2), via the conventional functions of the blocks 18 and 19, allows the mathematical construction of the model to truncate, trim, join together and round off the various patches and to fill in the parts of the model which do not require direct scanning or which are outside the Figure.

On the other hand if the separations between the real surface of the model and the mathematically constructed surface are greater than predetermined limits, from the automatic measurement block 66 (FIG. 3) the process passes to a block 68 which commands the automatic measurement, with the measuring machine 5, of the real surface of the model and the creation of the mathematical model of the surface, with compensation for the dimensions of the tip of the feeler 6 in a manner similar to that already described for the operation of the compensation block 63. In particular, by means of the block 29 (FIG. 2) automatic acquisition of internal points within the patch are commanded, according to three alternative approaches which can be chosen by the operator and of which two are automatic and for these the points to be detected on the model are automatically defined by the system according to two different algorithms: a first algorithm, based on the detection of a limited number of points and on the interpolation of these to produce the profiles, guarantees a more rapid but less precise process, whilst a second algorithm requires a greater number of points and operates directly by surface interpolation according to a slower but more precise process; the third approach, however, detects the points in a semi-automatic manner and such detection is definable by the user. In particular, in the first approach the system only controls the number of profiles and not the total number of acquisition points, the order of the surface is therefore an indicator of the undulation of the surface; in the second approach it is the system which detects the order of the surfaces and which determines the number of acquisition points, therefore determining all the sections and the detection of all the points considered necessary; in the third approach it is the user which defines the number of acquisition points, and the system is bound only by the laws existing between the number of points and the order of the surface. The block 29 therefore commands the reconstruction of the mathematical model of the surface of the workpiece taking account of the additional bounds represented by the points or profiles detected within the patch.

The same block 68 (FIG. 3) follows directly from the block 62 if the irregularities within the patch are considerable and therefore do not allow the supposition of a good approximation between the mathematical construction of the extended surface between the boundary curves and the real surface of the model.

From block 68 the process then passes to the block 64 which commands the checking of the separation between the compensated mathematical model and the physical model as already described.

From the block 67 there can further be provided a command for a final automatic comparison by means of the measurement machine 5 between the final mathematical model and the real surface of the piece.

The block 27 (FIG. 2) controls the execution of the final mathematical model with the drawing element 7 according to the various modifications of representation which can be obtained with conventional computer aided design (CAD) functions, whilst the block 28 controls printing on the printer 8 of detection data, for example data from the checks effected by block 64.

In any operating phase of the system presentations of data or reconstructions of surfaces on the video screen 3 or on the drawing element 7 can be required by the operator.

Figure 11:
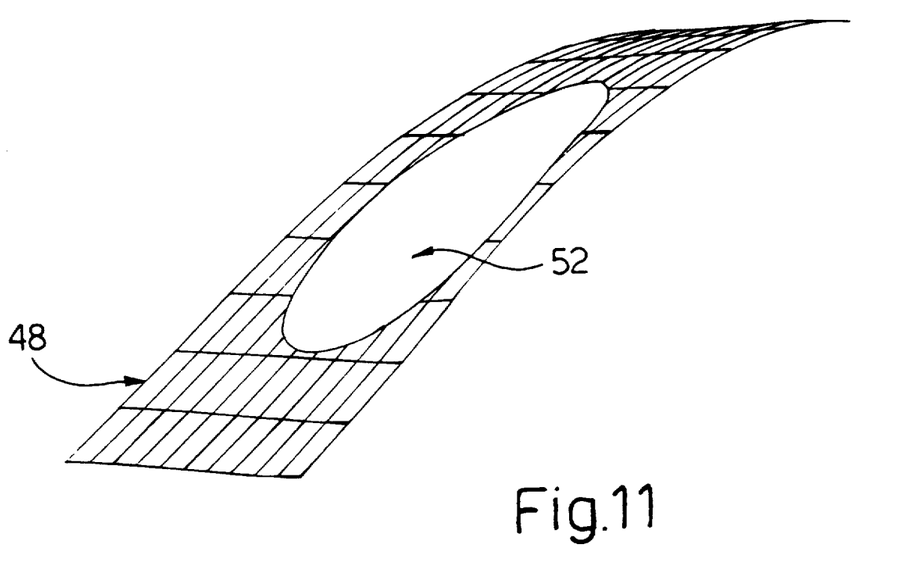

As is further visible in FIG. 11, in the final mathematical model representative of the physical model one or more zones 52 (islands) can be defined within a patch 41-42 under the control of the block 20 (FIG. 2), in which no reconstruction is made because it refers to parts of the model which it is not desired to reproduce, or to areas in which it is necessary to insert, in a subsequent phase, elements not present in the detection path.

The unit 1, starting from the final mathematical model, can then in a conventional manner produce the numerical control programmes necessary for working of the workpiece and usable for controlling the machine 9. In a conventional manner the operator can then display on the screen 3 of the unit 1 the path of the cutting tool of the machine tool 9 and can modify it in an interactive manner thus obviating the necessity of performing test cycles on the machine.

The advantages obtained with the system of the present invention are evident from what has been described, in fact it can be used as a design instrument in the use of objects having sculptured surfaces for which the purely mathematical design by means of conventional CAD instruments is inefficient. Such cases may include fashion designs which pass through a physical model stage constructed by the designer, or designs involving modifications introduced to a prototype during functional experimentation or motivated by production requirements.

The system of the present invention for mathematical representation of physical models is interactive, automatic and optimizes the use of the measuring machine, which is controlled in an automatic manner for detecting only the points necessary and sufficient for the process, moreover it integrates the functions of a conventional CAD/CAM system with those of a measuring machine seen as an intelligent peripheral of the station, and therefore allows the problem of the design of moulds to be resolved in a truly global manner in that they are defined by means of mathematical, physical or mixed model. The process of definition up to the final mathematical model takes place as an iterative cycle until reaching the level of desired fidelity, and a continuous process of checking the fidelity of the model in the form of the separation between corresponding physical and theoretical points is integrated into the mathematical transformation cycle in such a way as to provide a reliable indication, at each step, of the quality of the reconstruction.

The blocks 30 and 29 for detecting the curves and surfaces of the physical model organise, by means of the block 32, the control of the movements of the digtizer 5 and the acquisition of dimensional data in real time; these processes follow predetermined rules of priority and, by means of the block 26, interruption of a process in the course of execution by another having a higher level of priority is permitted. This approach permits the maximum exploitation of the digitizer 5 in that it makes it possible to put several curves and surfaces in sequence in the process and to make the machine operate autonomously both whilst the unit 1 is utilized in the management of other processes and during dead times.

Finally, it is clear that the embodiment of the present invention described and illustrated can have modifications and variations introduced thereto which do not depart from the ambit of the inventive idea contained in it. Among other things the unit 1 can be connected to any optional computer aided design and manufacture module (CAD/CAM) thus the initial acquisition of the coordinates of the guide points on the workpiece can also be made in an automatic manner by means of automatic detection means comprising, for example, vision systems which can detect the limits of the patches 41 and 42 on the workpiece and can control the detection of the guide points 40 by means of the digitizer. Alternatively, the unit 1 can manage the reconstruction process by the use of manual measuring machines controlled by many computers provided with a point guide, in such cases the machine operator is guided by the unit 1 on the individual points to detect, while the remaining manner of operation is the same as that for systems configured with the automatic measuring machine. Thus, also, the initial mathematical construction of the surface of the model, rather than being defined by the detection of guide points and edge points, can be provided at the central unit 1 by external CAD or by means of the digitized drawing table 10.

Or again, the system of the present invention can have a plurality of digitizers 5 controlled and operated by a single central unit 1 with the sole limitation that the video screen 3 can present information relating to the reconstruction of the model detected by only one machine at a time.

Among other things, the Bezier surfaces generated by the unit 1 could instead be approximated by surfaces described by means of Coons mathematics or other mathematics.

Finally, the feeler 6 of the measuring machine 5 can be replaced by any other type of probe, even a non-tactile probe, for example a laser; the digitizer 5 itself can have various configurations, for example it can be a measuring robot.

We claim:

1. An interactive system for the mathematical representation of physical models, characterized by the fact that it comprises at least one measuring robot or machine, means for processing and receiving information on at least initial identification points of said model and for providing automatic signals for the detection of information on additional points on said model by means of said measuring robot or machine, and second means for processing said information to produce said mathematical representation of said model, said means for processing said information including means for mathematically constructing the curves of boundaries approximating the projection of said initial identification points of said model and said additional points, and means for mathematically constructing an extended surface between said boundary curves.

2. A system according to claim 1, characterized by the fact that said second means for processing said information includes means for mathematically constructing, starting from said first mathematically defined surface, a second surface free from detection errors caused by the dimensions of a feeler of said measuring machine.

3. A system according to claim 1, characterized by the fact that said processor means includes means for the mathematical construction of a surface of said model starting from the said extended surface and approximating the projection of further additional points detected on said physical model.

4. A system according to claim 1, characterized by the fact that said means for processing said information includes means for checking the separation between said mathematical construction of the surface of said model and the corresponding surface of said physical model.

5. A system according to claim 4, characterized by the fact that said separations are calculated between corresponding points of said surfaces.

6. A system according to claim 4, characterized by the fact that said second means for processing said information includes means for statistical representation of said separations (50).

7. A system according to claim 4, characterized by the fact that said second means for processing said information includes means for checking if said separations lie within a predetermined range.

8. A system according to claim 7, characterized by the fact that said checking means enables means for final processing of said mathematical model or control of a subsequent approximated mathematical construction of the surface of said model via further said automatic signals for the detection of other information at additional points on said physical model.

* * * * *

UNITED STATES PATENT AND TRADEMARK OFFICE
CERTIFICATE OF CORRECTION

PATENT NO. : 5,148,372

DATED : September 15, 1992

INVENTOR(S) : Roberto Maiocco, Luciano Basadonna and Renato

It is certified that error appears in the above-indentified patent and that said Letters Patent is hereby corrected as shown below:

On the title page, Item [73]:
Please delete the city of the Assignee currently shown as "Turin" and insert the correct city of --Moncalieri --.

Signed and Sealed this

Fourteenth Day of June, 1994

Attest:

BRUCE LEHMAN

Attesting Officer

Commissioner of Patents and Trademarks